United States Patent
Familiant et al.

(10) Patent No.: US 8,947,030 B2
(45) Date of Patent: Feb. 3, 2015

(54) LOW SWITCH COUNT AC-TO-AC POWER CONVERTER

(71) Applicant: Eaton Corporation, Cleveland, OH (US)

(72) Inventors: Yakov Lvovich Familiant, Brown Deer, WI (US); Zeljko Radomir Jankovic, Milwaukee, WI (US); Bruno Patrice-Bernard Lequesne, Menomonee Falls, WI (US); Vijay Bhavaraju, Germantown, WI (US)

(73) Assignee: Eaton Corporation, Cleveland, OH (US)

( * ) Notice: Subject to any disclaimer, the term of this patent is extended or adjusted under 35 U.S.C. 154(b) by 208 days.

(21) Appl. No.: 13/729,266

(22) Filed: Dec. 28, 2012

(65) Prior Publication Data

US 2014/0184118 A1 Jul. 3, 2014

(51) Int. Cl.
*H02P 27/16* (2006.01)

(52) U.S. Cl.
CPC ..................................... *H02P 27/16* (2013.01)
USPC .................. 318/400.26; 318/400.01; 318/700

(58) Field of Classification Search
CPC ....................................................... H02P 27/16
USPC ................. 318/400.26, 400.01, 700
See application file for complete search history.

(56) References Cited

U.S. PATENT DOCUMENTS

| 5,625,545 A * | 4/1997 | Hammond ..................... 363/71 |
| 6,208,113 B1 | 3/2001 | Lelkes et al. |
| 7,345,449 B2 | 3/2008 | Barie et al. |

OTHER PUBLICATIONS

Yeh et al., "Fault Tolerant Operations in Adjustable-Speed Drives and Soft Starters for Induction Motors," Proc. of the 2007 IEEE Power Electronics Specialist Conference (PESC), pp. 1942-1949.
Familiant et al., "New Techniques for Measuring Impedance Characteristics of Three-Phase AC Power Systems," IEEE Transactions on Power Electronics, vol. 24, No. 7, Jul. 2009, pp. 1802-1810.

* cited by examiner

*Primary Examiner* — David S Luo
(74) *Attorney, Agent, or Firm* — Ziolkowski Patent Solutions Group, SC

(57) ABSTRACT

A load control device to control current flow to an AC load includes a circuit having line-side switches and floating-neutral side switches, along with a controller connected to the circuit that is programmed to control the circuit so as to cause each of the line-side switches and each of the floating-neutral side switches to switch between an On condition or an Off condition to selectively operate the circuit in an active mode and a free-wheeling mode. A full phase voltage is provided to the AC load during the active mode and a zero voltage is provided to the AC load during the free-wheeling mode. The controller applies a modulating function to the circuit, so as to modulate a supply voltage to control a frequency and an average of a load voltage present across terminals of the AC load, thereby enabling variable frequency operation of the AC load.

27 Claims, 4 Drawing Sheets

| CASE | SUB-CASE | Ia | Ib | Ic | IGBT 22 | IGBT 24 | IGBT 26 | IGBT 28 | IGBT 30 | IGBT 32 | Va, Vb, Vc (V ACROSS MACHINE TERMINALS) |
|---|---|---|---|---|---|---|---|---|---|---|---|
| U | U1 | POSITIVE + | NEGATIVE − | NEGATIVE − | ON | OFF | OFF | OFF | OFF | OFF | LINE VOLTAGE |
|   | U2 | POSITIVE + | NEGATIVE − | NEGATIVE − | OFF | OFF | OFF | OFF | ON | ON | 0 |
| V | V1 | POSITIVE + | POSITIVE + | NEGATIVE − | ON | ON | OFF | OFF | OFF | OFF | LINE VOLTAGE |
|   | V2 | POSITIVE + | POSITIVE + | NEGATIVE − | OFF | OFF | OFF | OFF | OFF | ON | 0 |
| W | W1 | NEGATIVE − | POSITIVE + | NEGATIVE − | OFF | ON | OFF | OFF | OFF | OFF | LINE VOLTAGE |
|   | W2 | NEGATIVE − | POSITIVE + | NEGATIVE − | OFF | OFF | ON | OFF | OFF | ON | 0 |
| U' | U'1 | NEGATIVE − | POSITIVE + | POSITIVE + | OFF | OFF | ON | ON | OFF | OFF | LINE VOLTAGE |
|   | U'2 | NEGATIVE − | POSITIVE + | POSITIVE + | OFF | ON | OFF | ON | OFF | OFF | 0 |
| V' | V'1 | NEGATIVE − | NEGATIVE − | POSITIVE + | OFF | OFF | ON | OFF | ON | OFF | LINE VOLTAGE |
|   | V'2 | NEGATIVE − | NEGATIVE − | POSITIVE + | ON | OFF | OFF | ON | OFF | OFF | 0 |
| W' | W'1 | POSITIVE + | NEGATIVE − | POSITIVE + | OFF | OFF | OFF | OFF | ON | OFF | LINE VOLTAGE |
|   | W'2 | POSITIVE + | NEGATIVE − | POSITIVE + | OFF | OFF | OFF | OFF | ON | OFF | 0 |

LOW SWITCH COUNT AC-TO-AC POWER CONVERTER

BACKGROUND OF THE INVENTION

The present invention relates generally to AC-to-AC converters and, more particularly, to AC-to-AC converters for motor drives and method of operation thereof that provides for variable frequency, variable voltage operation of the driven system, as particularly suited for the variable speed operation of electrical machines.

Electrical machines are often controlled by electronic drives (i.e., motor drives), especially to operate them at various speeds. Conventionally, such motor drives rectify the incoming AC voltage, smooth the DC voltage with a capacitor, and then invert it with a six-IGBT inverter. This makes it possible to operate the machine at any speed, since the machine speed is proportional to the frequency generated by the inverter. Many sophisticated controls have been devised for such drives.

Not all machines and applications, however, can make use of such sophistication, and lower cost motor drives would be desirable. Aside from drives, however, the only option on the market, specifically for induction machines, is the "soft starter", which typically employs silicon controlled rectifiers (SCRs) for reducing the inrush current to the motor but that offer limited control thereover (e.g., while SCRs can be turned on at will, they cannot be turned off in a dynamic and controllable fashion, as SCRs turn off naturally when the current reaches zero). Soft-starters that include IGBTs have been introduced more recently, but up until now such soft-starters have lacked the sophistication and controls necessary for controlling the machine and its load beyond the starting process.

It would therefore be desirable to provide a motor drive and method of operation thereof that provides many of the advantages of a sophisticated drive, but that is less complex and less expensive to manufacture.

BRIEF DESCRIPTION OF THE INVENTION

The present invention provides a system and method for variable speed operation of a load. A modulating function is applied to a line voltage such that a frequency, an average, and a phase of a voltage across the terminals of an AC load can be controlled to enable variable speed operation of the load.

In accordance with one aspect of the invention, a load control device to control current flow to an AC load is provided that includes a circuit having an input connectable to line terminals of an AC source so as to receive a supply voltage therefrom having a supply frequency, an output connectable to load terminals of the AC load, supply lines corresponding to phases in the AC load and connecting the input and output to transmit power from the AC source to the AC load, a plurality of line-side switches connected between the line terminals and the load terminals such that each supply line includes a line-side switch connected thereto, and a plurality of floating-neutral side switches connected to the load terminals at one end and together at a common connection at another end, such that each supply line includes a line-side switch connected thereto. The load control device also includes a controller connected to the circuit that is programmed to control the circuit so as to cause each of the plurality of line-side switches and each of the plurality of floating-neutral side switches to switch between an On condition or an Off condition to selectively operate the circuit in an active mode and a free-wheeling mode, with a full phase voltage being provided to the load terminals during the active mode and a zero voltage being provided to the load terminals during the free-wheeling mode. In controlling the circuit, the controller is programmed to apply a modulating function to the circuit, so as to modulate the supply voltage to control a frequency and an average of a load voltage present across the load terminals of the AC load, thereby enabling variable frequency operation of the AC load.

In accordance with another aspect of the invention, a method for controlling operation of an AC load includes the step of providing a supply voltage from an AC power source to an AC load, the supply voltage having a supply frequency. The method also includes the step of providing a circuit in series between the AC power source and the AC load to condition the supply voltage, the circuit comprising a plurality of switches forming a group of line-side switches connected to supply lines between line terminals of the AC power source and load terminals of the AC load and a group of floating-neutral side switches connected to the supply lines at one end and together at a common connection at another end. The method further includes the step of selectively operating the circuit in an active mode and a free-wheeling mode so as to selectively provide a full phase voltage to the load terminals during the active mode and a zero voltage to the load terminals during the free-wheeling mode of operation. Operation of the circuit further includes controlling a duty cycle of the circuit so as to control an average voltage to be applied to the AC load, with the duty cycle comprising a ratio of a time of circuit operation in the active mode to a total time of circuit operation. The duty cycle of the circuit is controlled by applying a voltage modulating periodic function to the circuit, so as to modulate a frequency of a load voltage present across the load terminals of the AC load and enable variable speed operation of the AC load.

In accordance with yet another aspect of the invention, a motor drive to control transmission of voltage and current from an AC power source to an AC motor includes an input connectable to line terminals of an AC power source so as to receive a supply voltage therefrom having a supply frequency, an output connectable to motor terminals of an AC motor, a plurality of supply lines connecting line terminals of the AC power source to motor terminals of the AC motor such that each supply line corresponds to a phase in the AC motor, and a plurality of insulated gate bipolar transistors (IGBTs) selectively switchable between an On condition and an Off condition to control transmission of voltage and current from an AC power source to an AC motor, with the plurality of IGBTs further including a group of line-side IGBTs connected to the supply lines between the line terminals and the motor terminals such that each supply line includes a line-side IGBT connected thereto and a group of floating-neutral side IGBTs connected to the supply lines at one end and together at a common connection at another end, such that each supply line includes a floating-neutral side IGBT connected thereto. The motor drive also includes a processor programmed to apply a voltage modulating control algorithm to control switching of each of the group of line-side IGBTs and each of the group of floating-neutral side IGBTs between an On condition or an Off condition to selectively operate the circuit in an active mode and a free-wheeling mode, with a full phase voltage being provided to the motor terminals during the active mode and a zero voltage being provided to the motor terminals during the free-wheeling mode. In applying the voltage modulating control algorithm, the processor is further programmed to control a duty cycle of the motor drive so as to control an average motor voltage to be applied to the AC motor, with the duty cycle comprising a ratio of a time of motor drive operation in the active mode to a total time of motor drive operation and modulate a frequency of a motor voltage present across the motor terminals of the AC motor, so as to enable variable speed operation of the AC motor.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a table illustrating a switching logic for switching IGBTs in the load control device in FIG. 1, according to an embodiment of the invention.

DETAILED DESCRIPTION OF THE PREFERRED EMBODIMENTS

The embodiments of the invention set forth herein relate to a motor drive and method of operation thereof that provides for variable speed operation of a load, such as an AC induction motor. A motor drive is provided that includes a plurality of switches (e.g., IGBTs) therein that control voltages and current to the AC motor, with a controller in the motor drive applying a modulating function to control operation of the switches in order to modulate a voltage provided to the motor and enable variable speed operation thereof. The approach uses a low number of switches to achieve this function.

Figure 1:
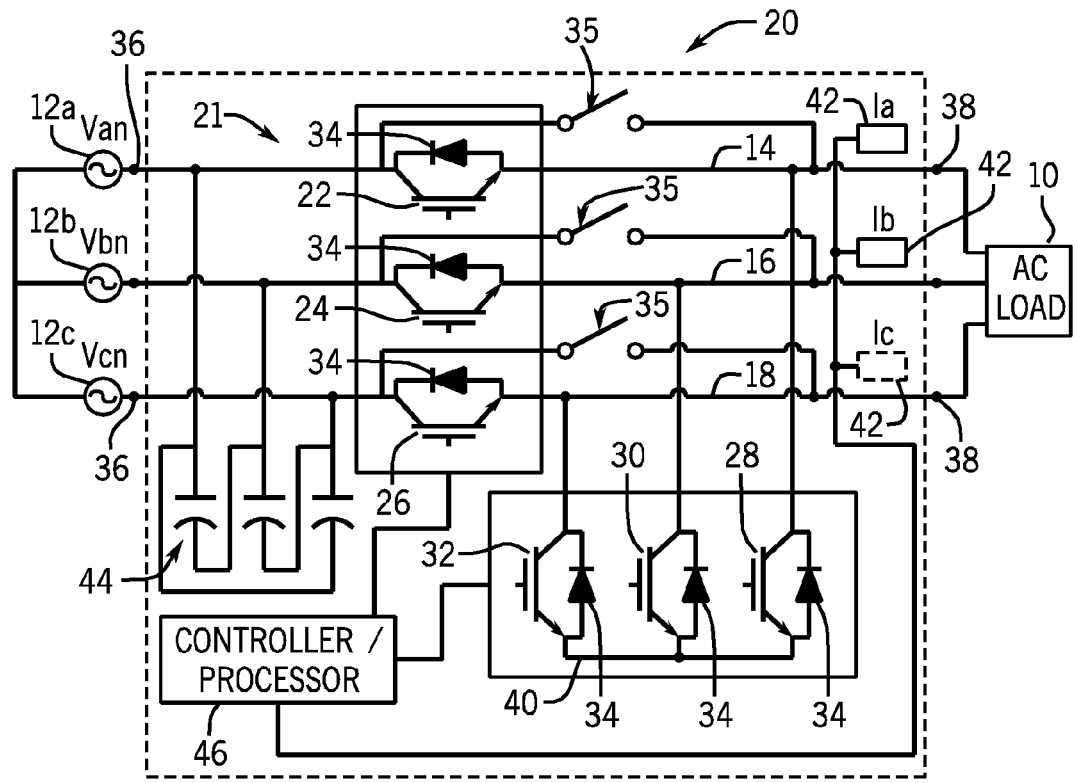
FIG. 1 is a schematic view of a 3-phase AC control system incorporating a load control device, such as a motor drive, for controlling voltage to the load in a controlled fashion, according to an embodiment of the invention.

Referring to FIG. 1, an AC load is shown for use with embodiments of the invention. The AC load 10 may be an electrical machine, such as a permanent magnet machine, a synchronous machine, or an induction machine, where power is supplied to the rotor (not shown) thereof by means of electromagnetic induction, with the AC load 10 being operatively connected to a three-phase AC source 12a-12c through corresponding supply lines 14, 16 and 18, respectively, so as to receive power therefrom. Thus, for purposes of reference, supply line 14 corresponds to a Phase A, supply line 16 corresponds to a Phase B, and supply line 18 corresponds to a Phase C. As shown in FIG. 1, a load control device 20 is connected between AC source 12a-12c and AC load 10 that performs an AC-AC conversion of the AC waveform generated by AC source 12a-12c to another AC waveform for input to the AC load 10. In an exemplary embodiment of the invention, load control device 20 comprises a motor drive configured to operate an AC motor at various speeds (i.e. a variable speed drive (VSD)), and thus the load control device is hereafter referred to as a motor drive. Generally speaking, motor drive 20 uses a 3-phase AC supply voltage as input and provides a controlled AC voltage to a load.

The basic structure of motor drive 20 is shown in FIG. 1 (i.e., circuitry 21 of the motor drive) as including a plurality of switches 22, 24, 26, 28, 30, 32 connected to supply lines 14, 16, 18, with each of the switches coupled in anti-parallel with a diode 34 so as to control the current flow and, in turn, the terminal voltages of the AC load 10. According to an exemplary embodiment of the invention, the switches are in the form of IGBTs, and thus the switches are hereafter referred to generally as IGBTs. However, it is noted that "IGBT" should be understood as any switch that can be turned on and off at will (at any frequency including high frequencies in the tens of kHz and beyond), IGBTs being currently a common technology in many induction motor drive applications. Other kinds of electronic switches, such as MOSFETs or MCTs (MOS-Controlled Thyristors) for instance, can be used depending on voltage level, power level, and other considerations.

Also included in motor drive 20 are optional contactors 35 corresponding to each phase of the power supply, that provide for a bypassing of the IGBTs 22, 24, 26, 28, 30, 32, when bypassing of the motor drive is desired. According to an exemplary embodiment of the invention, an arrangement of six IGBTs 22, 24, 26, 28, 30, 32 is provided in the motor drive. Three IGBTs 22, 24, 26 are connected between the line terminals 36 of AC source 12a-12c and the load terminals 38 of AC load 10, and thus are herein referred to as "line-side IGBTs". Three other IGBTs 28, 30, 32 that are referred to herein as "floating-neutral side IGBTs" are connected to the load terminals 38 at one end and together at a common connection 40 at the other end. This common connection 40 forms what is referred to herein as a "floating neutral point," with the qualifier "floating" being used to distinguish this point from the machine neutral or source neutral, to which it is not connected. As shown in FIG. 1, six IGBTs are provided corresponding to the number of phases (i.e., three phases), with one "line-side IGBT" and one "floating-neutral side IGBT" per phase. It is recognized, however, that any number of phases can be envisioned and thus embodiments of the invention can be readily extended from a 3-phase example, with two IGBTs per phase in general, with special consideration for the case of a single-phase system which requires two "line-side IGBTs" (one each for the line and return) and similarly two "floating-neutral side IGBTs". Further, it is to be noted that "IGBT" should be understood as any switch that can be turned on and off at will (at any frequency, including high frequencies in the tens of kHz and beyond), IGBTs being currently a common technology in many induction motor drive applications. Other kinds of electronic switches, such as MOSFETs or MCTs (MOS-Controlled Thyristors) for instance, can be used depending on voltage level, power level, and other considerations.

According to one embodiment of the invention, a means to sense the current in at least two of the load terminals 38 is included in motor drive 20, such as current sensors 42 positioned on two or more of supply lines 14, 16, 18. Additionally, according to one embodiment of the invention, capacitors 44 are positioned between the line terminals 36 and the line-side IGBTs 22, 24, 26 to provided buffering. While such capacitors 44 may be included in motor drive 20, it is recognized that the capacitors are small in size/capacity, as the controlling of the IGBTs 22, 24, 26, 28, 30, 32 according to a desired control scheme eliminates the need for larger capacitors and/or capacitors all together.

Also included in motor drive 20 is a controller or processor 46 configured to control operation of IGBTs 22, 24, 26, 28, 30, 32 via the transmission of gate drive signals thereto. During start-up or stopping (i.e., braking) of AC load 10, controller 46 functions to cause the contactors 35 to open such that power from AC source 12a-12c passes through the IGBTs. Controller 46 functions to selectively cause each of IGBTs to operate in an On or Off condition, so as to control the current flow (and therefore the voltage) applied to the AC load 10. According to embodiments of the invention, controller 46 is configured and programmed to implement a switching pattern control scheme that provides for full control of the voltage and current provided to load terminals 38 on supply lines 14, 16, 18, while providing for the current in the machine inductances to never be interrupted.

In implementing a switching control scheme or pattern for the IGBTs 22, 24, 26, 28, 30, 32, the controller 46 controls a switching of the IGBTs 22, 24, 26, 28, 30, 32 to the On and Off conditions based on a sensed direction of current flow (positive or negative) on each of the supply lines 14, 16, 18. More specifically, in whichever one phase (or two phases) the current is positive, either the corresponding line side IGBT(s) 22, 24, 26, are turned on and all other IGBTs are turned off or, alternatively, the floating-neutral side IGBTs 28, 30, 32 in the other two (or one) phases are turned on and all other IGBTs are turned off. In controlling the IGBTs to operate in the On and Off states in such a manner via controller 46, current is caused to always flows through the AC load 10.

The switching logic described above is summarized in FIG. 2, in that the switching of IGBTs 22, 24, 26, 28, 30, 32 is primarily governed by the sign of the current of each phase at any given time. Referring to FIG. 2, and with continued referenced to FIG. 1, "positive" current should be understood as "greater than zero", or "greater than a small positive number," and similarly for "negative" current. This is for cleaner implementation in the presence of noise, and to avoid control confusion when the current signal is exactly zero. As a result of controller 46 implementing the switching logic illustrated in FIG. 2, the load terminals 38 will see either full phase voltage as provided by the source ($V_a=V_{an}$, $V_b=V_{bn}$, and $V_c=V_{cn}$) or zero voltage in all three phases ($V_a=V_b=V_c=0$). The first instance is referred to as an "active period" while the latter is referred to as a "free-wheeling period." The ratio of the active period over the sum of the active period and the free-wheeling period is referred to as the duty cycle, and is a key element in controlling the average voltage supplied to the AC load 10. The "active" mode/period refers to energy transfer from the source to the load (as in a motoring mode for a machine), or from the load to the source (as in a generating, regenerating, or braking mode for a motor or a generator), as opposed to the "free-wheeling" mode/period where any energy transfer is generally confined to the load (losses in the drive and wiring notwithstanding.

In summary, the switching logic and pattern for switching IGBTs 22, 24, 26, 28, 30, 32 implemented by controller 46 is governed by the sign of the currents on Phases A, B, and C. Within each current pattern, the voltage applied to the AC load 10 is either full line voltage (i.e., active period), or zero (i.e., free-wheeling period), as controlled by the duty cycle of the switching of the IGBTs 22, 24, 26, 28, 30, 32. The overall frequency at which the IGBTs 22, 24, 26, 28, 30, 32 are turned on and off is an additional degree of freedom which can be put to advantage to reduce harmonics among other things.

In general, with respect to controlling the voltage across the load terminals, it can be observed that at any point in time, the control of the IGBTs can result in either one of two states: the motor drive is On (i.e., active mode where the machine voltage is the line voltage), or Off (i.e., free-wheeling mode where the voltage across the load terminals is zero). Consequently, the only mechanism for controlling voltage consists of controlling when, and for how long, the line-side IGBTs are on—that is, the duty cycle of the drive. According to embodiments of the invention, for purposes of controlling a frequency of the voltage across the load terminals, the controller 46 is further programmed to implement a modulating function M(t) to switch the IGBTs On and Off at a higher switching frequency $f_{sw}$ and to control the duty cycle, so as to modulate the supply line voltage across the load terminals 38 and enable variable speed operation of the AC load 10 by controlling the frequencies of the 3-phase voltage across the load terminals by choosing the correct modulating function.

According to embodiments of the invention, controller 46 modulates the line voltage V(t) by a modulating function M(t), such that the voltage $V_{mach}(t)$ across the load terminals is:

$$V_{mach}(t)=V(t)*M(t) \quad \text{[Eqn. 1]}.$$

Figure 3:
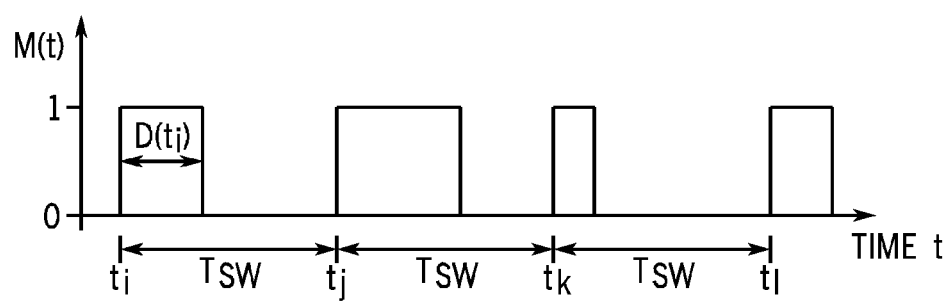
FIG. 3 is a diagram illustrating application of a modulating function over a period of time for switching IGBTs in the load control device in FIG. 1 to modulate a voltage waveform to the AC load, according to an embodiment of the invention.

M(t) is a higher-frequency (i.e., higher than the frequency of the supply voltage), periodic function with value of either 0 or 1, having a frequency $f_{sw}$, defining a period $T_{sw}$, as is illustrated in FIG. 3. Accordingly:

$$M(t)=1 \text{ if } 0<t<D(t)\times T_{sw} \text{ and}$$

$$M(t)=0 \text{ if } D(t)\times T_{sw}<t<T_{sw},$$

where D(t) is a "duty cycle" function value between 0 and 1 Preferably, the switching frequency $f_{sw}$ is a multiple of 6 times the supply frequency, e.g. a multiple of 360 Hz if the supply frequency is 60 Hz. The choice of that switching frequency is a trade-off between switching losses and lower harmonics. It can be noted that an induction motor has a synchronous speed that depends on the number of poles and the fundamental frequency of the voltage applied to its terminals. At 60 Hz supply, a two pole machine has a synchronous speed of 1800 rpm. In order to run the machine at different synchronous speeds, the modulating function along with the switching frequency will result in a fundamental frequency different from 60 Hz or the line frequency. Further, and in order to achieve a drive speed different from synchronous speed (corrected by slip in the case of an induction machine), the function D(t) should be periodic of the period n/60, where n is an integer >1. The number n corresponds to the desired drive speed (possibly corrected by slip).

Referring to FIG. 3, the average value $M_{ave}(t_i)$ of M(t) over a cycle $T_{sw}$ starting at time $t=t_i$ is:

$$M_{ave}(t_i)=D(t_i)$$

Therefore, on average over a short time span $T_{sw}$, the average machine voltage is:

$$V_{mach,ave}(t)=V(t)*M_{ave}(t)=V(t)*D(t) \quad \text{[Eqn. 2]}.$$

[Eqn. 2] is equivalent to [Eqn. 1] above, and may be a more convenient expression, especially when D(t) is a continuous function of t.

With the proper selection of the duty cycle function D(t), one can select the frequency and voltage supplied to AC load 10. Typically, the pattern of D(t) over time can be used for frequency selection, while either or both the magnitude and the width of the pulses in the function D(t) will determine the magnitude of the drive output voltage.

According to an exemplary embodiment of the invention, for a 3-phase machine operating from a 60 Hz grid, the modulating function M(t) is determinable in part from a duty cycle function D(t) that is a continuous function of t and is defined as:

$$D(t) = \frac{d}{2}[1 + \sin(2\pi(f_g - f_{out})t + \phi)], \quad \text{[Eqn. 3]}$$

where $f_g$=60 Hz, $f_{out}$ corresponds to the desired drive speed (possibly corrected by slip), φ can provide a phase shift, and d ("duty-cycle constant") is a real number between 0 and 1.

With d being a number between 0 and 1, a factor of ½ is necessary so that 0≤D(t)≤1. Therefore, if the line voltage is V(t)=V sin(2π$f_g$t), combining [Eqn. 2] and [Eqn. 3] leads to:

$$V_{mach,ave}(t) = \frac{d}{2} V \sin(2\pi f_g t) \cdot [1 + \sin(2\pi(f_g - f_{out})t + \phi)]. \quad [\text{Eqn. 4}]$$

With some manipulation:

$$V_{mach,ave}(t) = \quad [\text{Eqn. 5}]$$
$$\frac{d}{2} V \left[ \frac{1}{2}\cos(2f_{out}t + \phi) - \frac{1}{2}\cos(2\pi(2f_g - f_{out})t + \phi) + \sin(2\pi f_g t) \right].$$

Therefore, the machine is excited with 3 rotating fields, one at frequency $f_{out}$, one at frequency $f_g$ (normal synchronous speed), and one at frequency ($2f_g - f_{out}$). If $f_{out} < f_g$, then the machine can run at that corresponding lower speed (i.e., sub-synchronous speed). The machine can also run, in principle, at a "super-synchronous" speed corresponding to: ($2f_g - f_{out}$). The third rotating field, at frequency $f_g$, is at normal synchronous speed. As such, this third rotating field is of no immediate use since such rotating fields can be obtained by not modulating the line voltage.

For speeds near synchronous speed, the three rotating fields overlap. As a practical matter, therefore, operation of the motor drive (with modulation) at frequencies $f_{out}$ close to $f_g$ is difficult if not impossible. So with application of a modulation function as set forth in [Eqns. 3-5], the machine can run at any speed below and above synchronous speed. Speeds at or close to synchronous speed are achievable by not modulating the line voltage.

Further referring to [Eqn. 5], it is readily apparent that the magnitude of the output voltage is controlled by adjusting parameter d (i.e., the duty-cycle constant), and the phase φ can provide an additional control leverage by shifting the load voltage over time.

Figure 4:
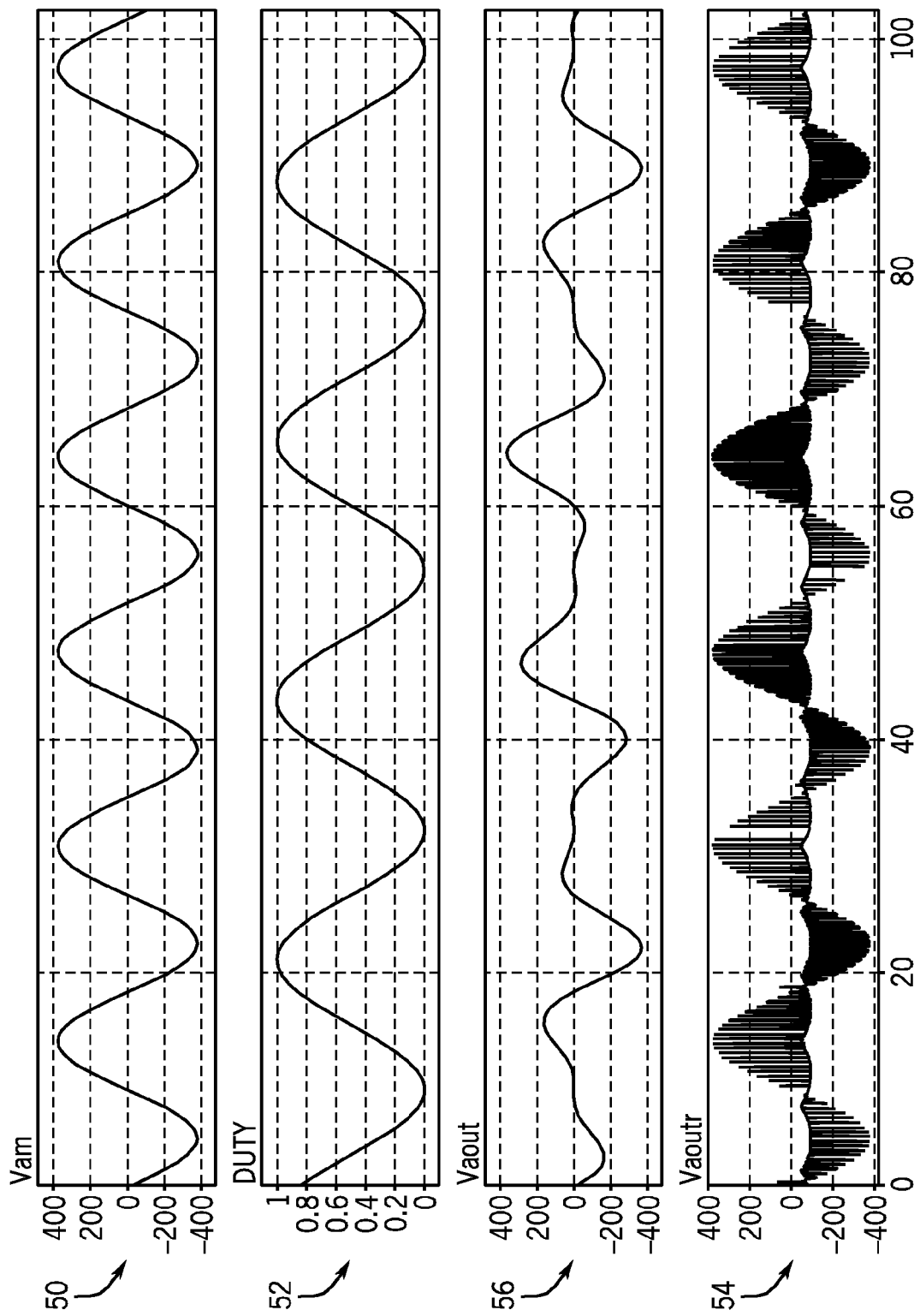
FIG. 4 is a diagram illustrating load terminal voltage modulation, according to an embodiment of the invention.

An example of machine voltage modulation resulting from application of the modulating function set forth in [Eqns. 3-5] by controller 46, is illustrated in FIG. 4. In FIG. 4, the top trace 50 shows the supply line voltage at 60 Hz. The second trace 52 is the duty-cycle function D(t), in this case with a duty cycle magnitude d of 1, and a frequency $f_{out}$=15 Hz (resulting in D(t) having a frequency of ($f_g - f_{out}$)=45 Hz). The bottom trace 54 is the resulting machine voltage, while the trace 56 is an intermediary calculation.

According to another embodiment of the invention, for a 3-phase machine operating from a 60 Hz power grid, the modulating function M(t) is determinable in part from a duty cycle function D(t) that is defined as:

$$D(t) = d \quad \text{if} \quad 0 < t < \frac{\lambda}{60} \quad [\text{Eqn. 6}]$$
$$D(t) = d \quad \text{if} \quad \frac{1}{3}\frac{n}{60} < t < \frac{1}{3}\frac{n}{60} + \frac{\lambda}{60}$$

-continued
$$D(t) = d \quad \text{if} \quad \frac{2}{3}\frac{n}{60} < t < \frac{2}{3}\frac{n}{60} + \frac{\lambda}{60}$$
$$D(t) = 0 \quad \text{otherwise, within the time bracket } 0 < t < \frac{n}{60},$$

where d ("duty-cycle constant") is a real number between 0 and 1, and λ ("conduction duration") is a real number between 0 and 0.5. Additionally, all terms in [Eqn. 6] may be shifted by an angle φ, in order to control the phase of the load voltage.

Figure 5A:
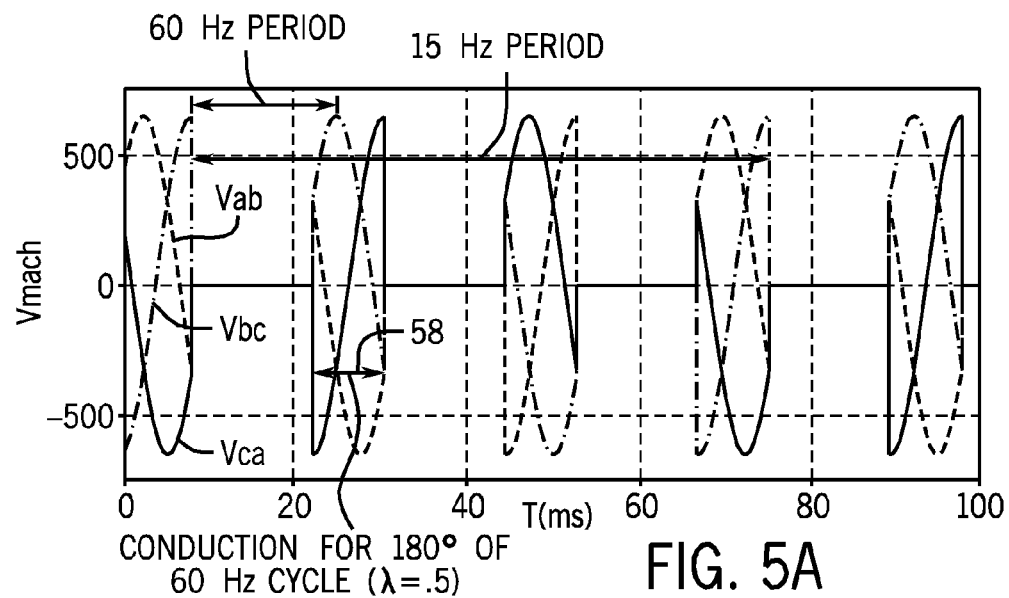
FIGS. 5A-5C are diagrams illustrating pulse skipping voltage modulation for various conduction durations and or duty cycle constants, according to an embodiment of the invention.
Figure 5B:
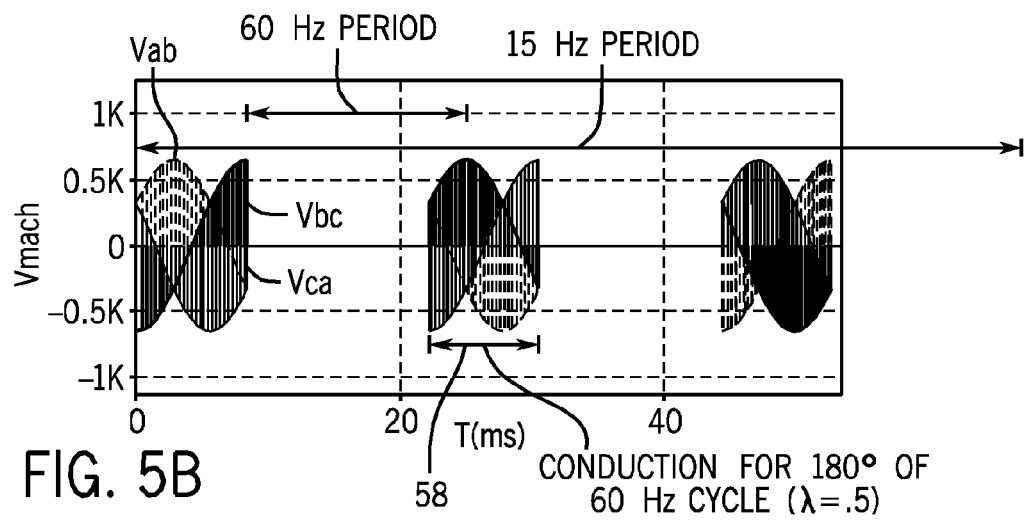
Figure 5C:
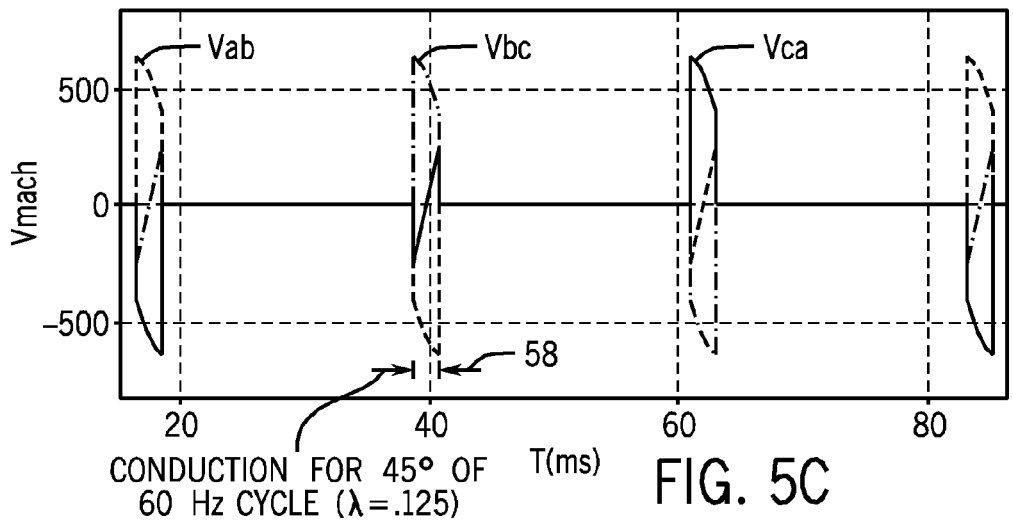

The modulating function cycle described above is referred to as "pulse skipping," and corresponds to exciting the drive for part of one 60 Hz cycle, then leaving it off for one or more "skipped" cycles. If (n−1) cycles are so skipped, the resulting main frequency of the machine voltage is 60 Hz/n, and the machine can be driven up to, and stably at, the corresponding speed (minus slip in the case of an induction machine), with selected speeds being possible based on the ratio of 60/n, such as ¼ of the machine synchronous speed for example. This is illustrated in FIGS. 5A, 5B, and 5C, for the case where n=4 (15 Hz), with three sub-cases being shown. In FIGS. 5A and 5B, the conduction period or duration λ, identified as 58, is maximum (λ=0.5), that is, conduction occurs over half of a 60 Hz cycle, or 180°. In the first case (FIG. 5A), the duty-cycle constant d is 1, that is, the drive conducts all the time within the conduction period. In the second case (FIG. 5B), d is 0.5, that is, the voltage is chopped, and is on half of the time and off half of the time. In the second case, the switching frequency is 7×360 Hz in this example. The third sub-case (FIG. 5C) is an example of a smaller conduction period 58 (λ=0.125, or 45° out of the 360° of each 60 Hz cycle), for a duty cycle constant d=1. If the conduction duration λ is less than 0.5, it is preferably centered in the middle of the possible conduction span. Further, it can be contemplated that there will be several conduction periods within one conduction span, adding up to 0.5, not all necessarily equal, and preferably but not necessarily symmetrically centered in the middle of the conduction span.

In implementing a pulse skipping modulation function by way of control 46, the motor drive can be turned on $(1/n)^{th}$ of the time, so that (n−1) cycles are skipped, resulting in a fundamental frequency at the load terminals of 60/n Hz. Conduction is therefore permissible during a fraction of the time. Aside from skipping (n−1) cycles, the drive also conducts, at the most, for only half of the 60 Hz cycle. This is reflected by the coefficient λ, which is a number up to 0.5. Further still, within this conduction period, the voltage is chopped at a higher frequency at a constant duty cycle d. Accordingly, the number n determines the machine operating speed, and the coefficient λ and the constant duty cycle d determine the average voltage at the load terminals. For a given desired voltage, choosing λ=0.5 (maximum value), then adjusting d, is preferable in terms of reducing harmonics (at the expense of increasing switching losses). The chopping frequency is preferably a multiple of 6 times the supply frequency, e.g. a multiple of 360 Hz if the supply frequency is 60 Hz, and is 7×360 Hz in this example. The choice of that switching frequency is again a trade-off between switching losses and lower harmonics.

It is recognized that controller 46 can implement a modulating function as set forth above for a number of different applications/motor operations. For example, the controller can implement a modulating function for starting a motor, by sweeping the "desired operating speed" from zero to near synchronous speed. Upon reaching near synchronous speed, application of the modulating function can be stopped such that the motor can be switched to direct operation (as described with respect to the switching logic of the IGBTs shown in FIG. 2) or to a bypass mode in which the contactors 35 are closed to bypass the IGBTs.

As another example, the controller 46 can implement a modulating function for purposes of functioning as a regenerative drive. A conventional drive, when decelerating a load, will send energy back to the DC link. This energy can be stored in the DC link capacitor, but if the amount of energy is significant, the capacitor needs to be large. Alternatively, the energy can be wasted in a resistor bank. Finally, for regeneration to the grid, the diode bridge must be replaced by an active inverter. By contrast, the present invention makes it possible to operate at any speed, in either motoring or generating mode, with only six IGBT switches, half as many as in a conventional, regenerative drive. In the case of an induction motor drive, regeneration is achieved by selecting an output frequency corresponding to a speed lower than the speed of the machine, so as to have a negative slip. For synchronous machines, regeneration is done by selecting an appropriate phase $\phi$. In the latter case, and in a different respect, other values of phase $\phi$ will also allow field-weakening operation of the machine.

As still another example, the controller 46 can implement a modulating function for purposes of reversing a direction of operation of the AC motor. It is possible to modulate the line voltage in such a way as to effectively change the order of excitation of the 3 phases of the motor, from say phases A-B-C to phases A-C-B. This has the effect of making operation in the reverse direction possible. That is, with respect to the modulation function referenced in FIG. 5, for example, the choice of n=2, 5, 8, 11, etc, leads to reverse-direction operation, while values of n=4, 7, 10, etc, leads to operation in the same direction as with 60 Hz. More generally:

n=i*p−1 for reverse direction operation, and
n=i*p+1 for standard direction operation,
where p is the number of phases (generally p=3), and i is any integer larger or equal to 1.

Beneficially, the applying of a modulating function by the controller 46 for controlling the switching of the IGBTs 22, 24, 26, 28, 30, 32 provides for variable speed operation of the AC motor 10, while providing such capability in the form of a motor drive 20 that is less complex and less expensive to manufacture than traditional VSDs. Application of the modulating function also provides for: starting a motor by sweeping the desired operating speed from zero to near synchronous speed, operating the motor drive as a regenerative drive, and/or for reversing a direction of operation of the AC motor.

A technical contribution for the disclosed method and apparatus is that it provides for a computer implemented technique for modulating a line voltage by application of a modulating function, such that a frequency, an average, and a phase of a voltage across the motor terminals of an AC motor can be controlled to enable variable speed operation of the motor. The application of the modulating function controls switching of a plurality of IGBTs in the motor drive to control a duty cycle of the drive, so as to modulate the voltage.

While this invention was described in the particular case where the load 10 is an AC electric machine, induction, synchronous, permanent magnet, reluctance, brushless, or other, it will be recognized that it is, generally speaking, a control device and method of operation thereof for changing the frequency in an AC electric circuit, such that a load can be operated at a frequency other than that of the supply.

Therefore, according to one embodiment of the present invention, a load control device to control current flow to an AC load is provided that includes a circuit having an input connectable to line terminals of an AC source so as to receive a supply voltage therefrom having a supply frequency, an output connectable to load terminals of the AC load, supply lines corresponding to phases in the AC load and connecting the input and output to transmit power from the AC source to the AC load, a plurality of line-side switches connected between the line terminals and the load terminals such that each supply line includes a line-side switch connected thereto, and a plurality of floating-neutral side switches connected to the load terminals at one end and together at a common connection at another end, such that each supply line includes a line-side switch connected thereto. The load control device also includes a controller connected to the circuit that is programmed to control the circuit so as to cause each of the plurality of line-side switches and each of the plurality of floating-neutral side switches to switch between an On condition or an Off condition to selectively operate the circuit in an active mode and a free-wheeling mode, with a full phase voltage being provided to the load terminals during the active mode and a zero voltage being provided to the load terminals during the free-wheeling mode. In controlling the circuit, the controller is programmed to apply a modulating function to the circuit, so as to modulate the supply voltage to control a frequency and an average of a load voltage present across the load terminals of the AC load, thereby enabling variable frequency operation of the AC load.

According to another embodiment of present invention, a method for controlling operation of an AC load includes the step of providing a supply voltage from an AC power source to an AC load, the supply voltage having a supply frequency. The method also includes the step of providing a circuit in series between the AC power source and the AC load to condition the supply voltage, the circuit comprising a plurality of switches forming a group of line-side switches connected to supply lines between line terminals of the AC power source and load terminals of the AC load and a group of floating-neutral side switches connected to the supply lines at one end and together at a common connection at another end. The method further includes the step of selectively operating the circuit in an active mode and a free-wheeling mode so as to selectively provide a full phase voltage to the load terminals during the active mode and a zero voltage to the load terminals during the free-wheeling mode of operation. Operation of the circuit further includes controlling a duty cycle of the circuit so as to control an average voltage to be applied to the AC load, with the duty cycle comprising a ratio of a time of circuit operation in the active mode to a total time of circuit operation. The duty cycle of the circuit is controlled by applying a voltage modulating periodic function to the circuit, so as to modulate a frequency of a load voltage present across the load terminals of the AC load and enable variable speed operation of the AC load.

According to yet another embodiment of the present invention, a motor drive to control transmission of voltage and current from an AC power source to an AC motor includes an input connectable to line terminals of an AC power source so as to receive a supply voltage therefrom having a supply frequency, an output connectable to motor terminals of an AC motor, a plurality of supply lines connecting line terminals of the AC power source to motor terminals of the AC motor such that each supply line corresponds to a phase in the AC motor, and a plurality of insulated gate bipolar transistors (IGBTs) selectively switchable between an On condition and an Off condition to control transmission of voltage and current from an AC power source to an AC motor, with the plurality of IGBTs further including a group of line-side IGBTs connected to the supply lines between the line terminals and the motor terminals such that each supply line includes a line-side IGBT connected thereto and a group of floating-neutral side IGBTs connected to the supply lines at one end and together at a common connection at another end, such that each supply line includes a floating-neutral side IGBT connected thereto. The motor drive also includes a processor programmed to apply a voltage modulating control algorithm to control switching of each of the group of line-side IGBTs and each of the group of floating-neutral side IGBTs between an On condition or an Off condition to selectively operate the circuit in an active mode and a free-wheeling mode, with a full phase voltage being provided to the motor terminals during the active mode and a zero voltage being provided to the motor terminals during the free-wheeling mode. In applying the voltage modulating control algorithm, the processor is further programmed to control a duty cycle of the motor drive so as to control an average motor voltage to be applied to the AC motor, with the duty cycle comprising a ratio of a time of motor drive operation in the active mode to a total time of motor drive operation and modulate a frequency of a motor voltage present across the motor terminals of the AC motor, so as to enable variable speed operation of the AC motor.

The present invention has been described in terms of the preferred embodiment, and it is recognized that equivalents, alternatives, and modifications, aside from those expressly stated, are possible and within the scope of the appending claims.

What is claimed is:

1. A load control device to control current flow to an AC load, the load control device comprising:
a circuit including:
an input connectable to line terminals of an AC source so as to receive a supply voltage therefrom, the supply voltage having a supply frequency;
an output connectable to load terminals of the AC load;
supply lines connecting the input and output to transmit power from the AC source to the AC load, each supply line corresponding to a phase in the AC load;
a plurality of line-side switches connected between the line terminals and the load terminals, such that each supply line includes a line-side switch connected thereto; and
a plurality of floating-neutral side switches connected to the load terminals at one end and together at a common connection at another end, such that each supply line includes a line-side switch connected thereto; and
a controller connected to the circuit and being programmed to control the circuit so as to cause each of the plurality of line-side switches and each of the plurality of floating-neutral side switches to switch between an On condition or an Off condition to selectively operate the circuit in an active mode and a free-wheeling mode, with a full phase voltage being provided to the load terminals during the active mode and a zero voltage being provided to the load terminals during the free-wheeling mode;
wherein, in controlling the circuit, the controller is programmed to apply a modulating function to the circuit, so as to modulate the supply voltage to control a frequency and an average of a load voltage present across the load terminals of the AC load, thereby enabling variable frequency operation of the AC load.

2. The load control device of claim 1 wherein, in applying the modulating function, the controller is programmed to implement a duty cycle function that is a continuous function of time, the duty cycle function comprising a sine function.

3. The load control device of claim 2 wherein, in applying the duty cycle function, the controller causes a voltage waveform to be generated across the load terminals having a plurality of frequencies, so as to excite the AC load with three rotating fields.

4. The load control device of claim 3 wherein the plurality of frequencies of the voltage waveform comprises a first frequency that is equal to the supply frequency, a second frequency that is less than the supply frequency, and a third frequency that is greater than the supply frequency.

5. The load control device of claim 4 wherein the voltage waveform comprising at least the first frequency, second frequency, and third frequency is described as:

$$V_{mach,ave}(t) = \frac{d}{2}V\left[\frac{1}{2}\cos(2\pi f_{out}t + \phi) - \frac{1}{2}\cos(2\pi(2f_g - f_{out})t + \phi) + \sin(2\pi f_g t)\right],$$

where d is a duty cycle constant, V is the supply voltage, $f_g$ is the supply frequency, $f_{out}$ is the desired load frequency, and $\phi$ is the desired phase of the load voltage.

6. The load control device of claim 1 wherein the plurality of switches comprises insulated gate bipolar transistors (IGBTs).

7. The load control device of claim 1 wherein the AC load comprises an AC motor.

8. The load control device of claim 7 wherein the AC motor comprises one or more of an induction motor, a synchronous motor, a reluctance motor, a permanent magnet motor, and a brushless motor.

9. The load control device of claim 1 wherein, in applying the modulating function, the controller is programmed to apply a pulse skipping modulating function where the circuit is operated in active mode for part of one supply frequency cycle and is operated in free-wheeling mode for one or more skipped supply frequency cycles.

10. The load control device of claim 9 wherein applying the pulse skipping modulating function results in a fundamental frequency at the load terminals of:

$$f_{out} = \frac{f_g}{n},$$

where $f_g$ is the supply voltage frequency and n is the number of cycles skipped plus one.

11. The load control device of claim 9 wherein, in applying the pulse skipping modulating function, a duty cycle function defined as:

$$\begin{aligned}D(t) = d \quad &\text{if} \quad 0 < t < \frac{\lambda}{60}\\D(t) = d \quad &\text{if} \quad \frac{1}{3}\frac{n}{60} < t < \frac{1}{3}\frac{n}{60} + \frac{\lambda}{60}\\D(t) = d \quad &\text{if} \quad \frac{2}{3}\frac{n}{60} < t < \frac{2}{3}\frac{n}{60} + \frac{\lambda}{60}\\D(t) = 0 \quad &\text{otherwise, within the time bracket } 0 < t < \frac{n}{60},\end{aligned}$$

where d is a duty cycle constant comprising a real number between 0 and 1, and λ is a conduction duration comprising a real number between 0 and 0.5.

12. The load control device of claim 11 wherein the controller is programmed to control the conduction duration $\lambda$ and the duty cycle constant d to achieve a desired average load voltage at the load terminals.

13. The load control device of claim 12 wherein the conduction duration $\lambda$ is equal to 0.5 and the controller is programmed to control the duty cycle constant d to achieve a desired average load voltage at the load terminals.

14. The load control device of claim 9 wherein, in applying the pulse skipping modulating function, the controller is programmed to cause the circuit to chop the supply voltage at a higher frequency and at a constant duty cycle during operation in the active mode.

15. The load control device of claim 14 wherein the supply voltage chopping frequency is a multiple of 6 times the supply frequency.

16. The load control device of claim 1 wherein the controller is programmed to apply the modulating function during start-up of the AC load, so as to increase a speed of the AC load from zero to a synchronous speed.

17. The load control device of claim 1 wherein the controller is programmed to apply the modulating function to enable operation of the AC load in one of a motoring mode or a generating mode.

18. The load control device of claim 1 wherein the controller is programmed to apply the modulating function during the stopping of the AC load, so as to decrease the speed of the AC load at a predetermined rate from a synchronous to zero speed.

19. The load control device of claim 1 wherein the controller is programmed to apply the modulating function to control an order of excitation of the phases of the AC load, so as to enable operation of the AC load in a reverse direction.

20. A method for controlling operation of an AC load comprising:
providing a supply voltage from an AC power source to an AC load, the supply voltage having a supply frequency;
providing a circuit in series between the AC power source and the AC load to condition the supply voltage, the circuit comprising a plurality of switches forming a group of line-side switches connected to supply lines between line terminals of the AC power source and load terminals of the AC load and a group of floating-neutral side switches connected to the supply lines at one end and together at a common connection at another end; and
selectively operating the circuit in an active mode and a free-wheeling mode so as to selectively provide a full phase voltage to the load terminals during the active mode and a zero voltage to the load terminals during the free-wheeling mode of operation;
wherein operating the circuit further comprises controlling a duty cycle of the circuit so as to control an average voltage to be applied to the AC load, with the duty cycle comprising a ratio of a time of circuit operation in the active mode to a total time of circuit operation; and
wherein the duty cycle of the circuit is controlled by applying a voltage modulating periodic function to the circuit, so as to modulate a frequency of a load voltage present across the load terminals of the AC load and enable variable speed operation of the AC load.

21. The method of claim 20 further comprising causing a voltage waveform to be generated across the load terminals having a plurality of frequencies, so as to excite the AC load with a plurality of rotating fields, the plurality of frequencies of the voltage waveform comprising at least a first frequency that is equal to the supply frequency, a second frequency that is less than the supply frequency, and a third frequency that is greater than the supply frequency.

22. The method of claim 21 wherein the voltage waveform comprising at least the first frequency, second frequency, and third frequency is described as:

$$V_{mach,ave}(t) = \frac{d}{2} V \left[ \frac{1}{2}\cos(2\pi f_{out} t + \phi) - \frac{1}{2}\cos(2\pi(2f_g - f_{out})t + \phi) + \sin(2\pi f_g t) \right],$$

where d is a duty cycle constant, V is the supply voltage, $f_g$ is the supply frequency, $f_{out}$ is the desired load frequency, and $\phi$ is the desired phase of the load voltage.

23. The method of claim 20 wherein applying the voltage modulating periodic function comprises applying a pulse skipping modulating function where the circuit is operated in active mode for part of one supply voltage frequency cycle and is operated in free-wheeling mode for one or more skipped supply voltage frequency cycles.

24. The method of claim 20 wherein applying the pulse skipping modulating function further comprises defining a duty cycle function as:

$$D(t) = d \quad \text{if} \quad 0 < t < \frac{\lambda}{60}$$

$$D(t) = d \quad \text{if} \quad \frac{1}{3}\frac{n}{60} < t < \frac{1}{3}\frac{n}{60} + \frac{\lambda}{60}$$

$$D(t) = d \quad \text{if} \quad \frac{2}{3}\frac{n}{60} < t < \frac{2}{3}\frac{n}{60} + \frac{\lambda}{60}$$

$$D(t) = 0 \quad \text{otherwise, within the time bracket } 0 < t < \frac{n}{60},$$

where d is a duty cycle constant comprising a real number between 0 and 1, and $\lambda$ is a conduction duration comprising a real number between 0 and 0.5, and wherein the conduction duration $\lambda$ and the duty cycle constant d are controlled to achieve a desired average load voltage at the load terminals.

25. A motor drive to control transmission of voltage and current from an AC power source to an AC motor, the motor drive comprising:
an input connectable to line terminals of an AC power source so as to receive a supply voltage therefrom, the supply voltage having a supply frequency;
an output connectable to motor terminals of an AC motor;
a plurality of supply lines connecting line terminals of the AC power source to motor terminals of the AC motor, each supply line corresponding to a phase in the AC motor;
a plurality of insulated gate bipolar transistors (IGBTs) selectively switchable between an On condition and an Off condition to control transmission of voltage and current from an AC power source to an AC motor, the plurality of IGBTs including:
a group of line-side IGBTs connected to the supply lines between the line terminals and the motor terminals, such that each supply line includes a line-side IGBT connected thereto; and
a group of floating-neutral side IGBTs connected to the supply lines at one end and together at a common connection at another end, such that each supply line includes a floating-neutral side IGBT connected thereto; and a processor programmed to apply a voltage modulating control algorithm to control switching of each of the group of line-side IGBTs and each of the group of floating-neutral side IGBTs between an On condition or an Off condition to selectively operate the circuit in an active mode and a free-wheeling mode, with a full phase voltage being provided to the motor terminals during the active mode and a zero voltage being provided to the motor terminals during the free-wheeling mode;

wherein, in applying the voltage modulating control algorithm, the processor is further programmed to:

control a duty cycle of the motor drive so as to control an average motor voltage to be applied to the AC motor, with the duty cycle comprising a ratio of a time of motor drive operation in the active mode to a total time of motor drive operation; and modulate a frequency of a motor voltage present across the motor terminals of the AC motor, so as to enable variable speed operation of the AC motor.

26. The motor drive of claim 25 wherein, in applying the voltage modulating control algorithm, the processor is programmed to apply a sinusoidal modulating function, with a product of the supply voltage and the sinusoidal modulating function generating a motor voltage waveform across the motor terminals having a plurality of frequencies, so as to excite the AC motor with a plurality of rotating fields.

27. The motor drive of claim 25 wherein, in applying the voltage modulating control algorithm, the processor is programmed to apply a pulse skipping modulating function where the motor drive is operated in active mode for part of one supply voltage frequency cycle and is operated in free-wheeling mode for one or more skipped supply voltage frequency cycles.

* * * * *